United States Patent [19]
Hillis

[11] Patent Number: 5,241,600
[45] Date of Patent: Aug. 31, 1993

[54] VERTIFICATION SYSTEM FOR CREDIT OR BANK CARD OR THE LIKE

[75] Inventor: W. Daniel Hillis, Cambridge, Mass.

[73] Assignee: Thinking Machines Corporation, Cambridge, Mass.

[21] Appl. No.: 730,713

[22] Filed: Jul. 16, 1991

[51] Int. Cl.<sup>5</sup> ............................................. H04K 1/00
[52] U.S. Cl. ..................................... 380/23; 380/24; 380/25
[58] Field of Search .............................. 380/23–25, 380/54

[56] References Cited

U.S. PATENT DOCUMENTS

| | | | |
|---|---|---|---|
| 4,138,057 | 2/1979 | Atalla | 380/54 |
| 4,202,626 | 5/1980 | Mayer, Jr. et al. | 380/54 |
| 4,423,415 | 12/1983 | Golman | 380/23 |
| 4,879,747 | 11/1989 | Leighton et al. | 380/23 |
| 4,972,475 | 11/1990 | Sant'Anselmo | 380/54 |
| 4,972,476 | 11/1990 | Nathans | 380/23 |
| 4,991,205 | 2/1991 | Lemelson | 380/23 |
| 5,016,274 | 5/1991 | Micali et al. | 380/23 |
| 5,027,401 | 6/1991 | Soltesz | 380/54 |

Primary Examiner—Salvatore Cangialosi
Attorney, Agent, or Firm—Richard A. Jordan

[57] ABSTRACT

A verification system for verifying authorized use of a credit or bank card or other identification card. The verification system makes use of an image embossed on or laminated onto a card, and information stored on a magnetic strip or other storage arrangement laminated onto or otherwise affixed to the card. The information stored on the card is related to the image embossed on the card. A card reader reads the image and generates a information defining the image. In addition, the card reader reads the information and compares it to the image signature to determine if they conform. Further use of the card may be based on the degree of comparison between the information read from the card and the image signature.

6 Claims, 1 Drawing Sheet

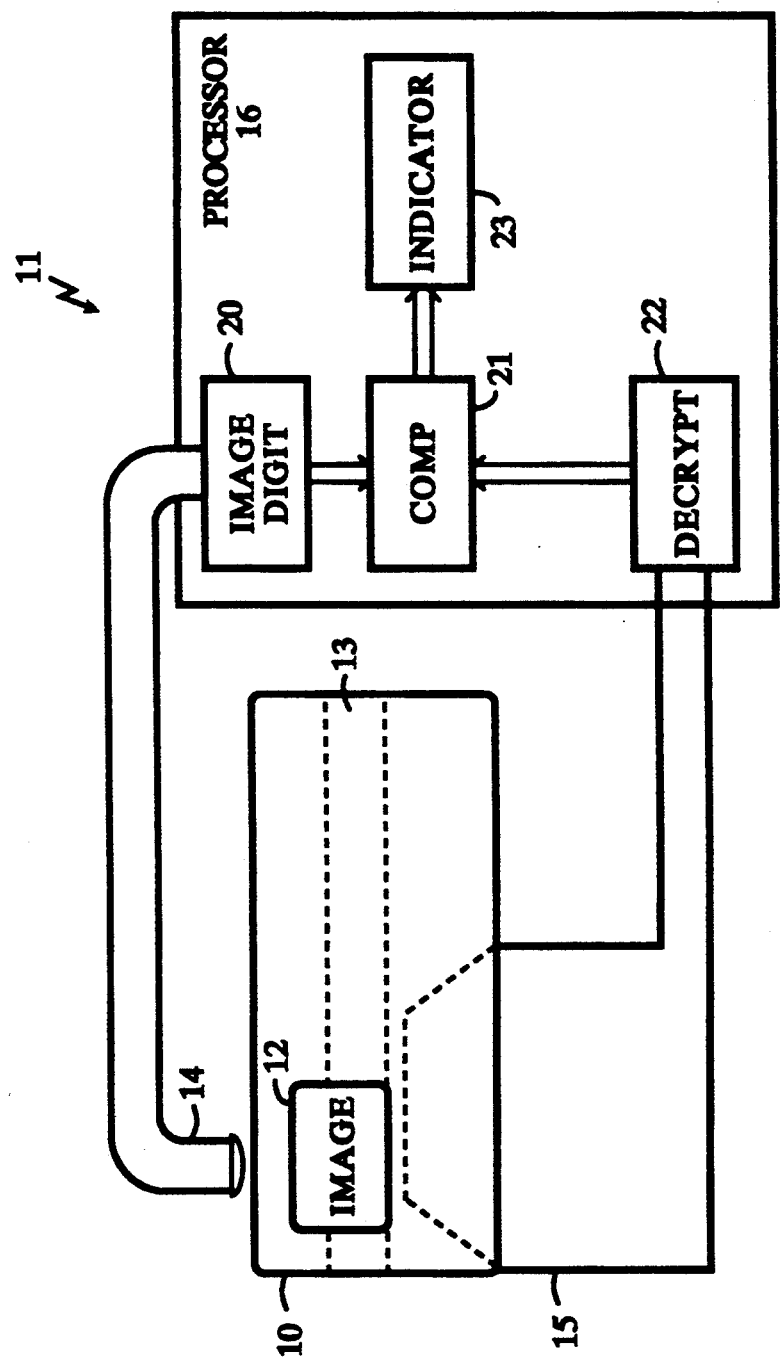

VERTIFICATION SYSTEM FOR CREDIT OR BANK CARD OR THE LIKE

FIELD OF THE INVENTION

The invention relates generally to the field of systems for verifying or checking information, and more particularly provides an arrangement for verifying that the possessor of, for example, a credit or bank card or similar identification card is in rightful possession of such card.

BACKGROUND OF THE INVENTION

Theft or unauthorized use of credit or bank cards and forgery are significant problems. To combat forgery, card issuers have put, for example, holograms or other designs on the faces of the cards, which are difficult to forge. To combat theft or use by persons who are not authorized, most bank cards, for example, require use of a "PIN" or "personal identification number" which the user maintains separate from the card. Each card has associated therewith information, either in a magnetic strip or other storage arrangement which may be laminated on the card or in a central database, which may be used to check the PIN when the card is used. When the user wishes to use the card, he or she has to provide the PIN, which is checked against the information and a transaction is authorized if they conform. This arrangement, however, requires the user to remember the PIN, or maintain it separately from the card itself.

Other arrangements have also been proposed. In one particular arrangement, information is stored on the card which may be read by a magnetic reader, from which an image may be displayed representing personal indicia of the authorized user. The clerk may visually observe the user and the image and if they compare favorably may perform the transaction.

In any case, if information is maintained on the card, it is typically encrypted to ensure that an unauthorized person cannot store substitute information which might allow him or her to use the card. The information may be encrypted using a "private key-public key" encryption mechanism, in which the information is encrypted using a key that is known only by the card issuer, but may be decrypted using a key that may be publicly known. In that situation, the card reader where the information is used, either in determining the information conforms to the PIN or to generate the image, may have the public key information to facilitate decryption. However, since the encryption key, which is used to encrypt the information for storage on the card, is known only by the card issuer, only the card issuer may store valid information on the card. If an unauthorized user stores information on a card, unless he or she knows the private encryption key, or in the unlikely event that he or she correctly guesses the private encryption key, the information will likely not decrypt properly, in which case the clerk can refuse to perform the transaction.

SUMMARY OF THE INVENTION

The invention provides a new and improved verification system for credit or bank card or the like.

In brief summary, the verification system makes use of an image embossed on or laminated onto a card, and information stored on a magnetic strip or other storage arrangement laminated onto or otherwise affixed to the card. The information stored on the card is related to the image embossed on the card. A card reader reads the image and generates information defining the image. In addition, the card reader reads the information and compares it to the image information to determine if they conform. Further use of the card may be based on the degree of comparison between the information read from the card and the image information.

In a refinement, the information recorded may be encrypted using a public-key/private-key encryption arrangement. In such an arrangement, the encryption is performed using a key known only by the card issuer, but the decryption, which is performed by the card reader before comparing it to the image information, may be performed using a publicly-known key. Since the information is encrypted using a key known only by the card issuer, information which may be subsequently stored by others will likely not be properly encrypted, in which case the comparison would likely fail. This would generally protect against unauthorized entry of information on the card, which may effect the appropriate comparison.

BRIEF DESCRIPTION OF THE DRAWINGS

This invention is pointed out with particularity in the appended claims. The above and further advantages of this invention may be better understood by referring to the following description taken in conjunction with the accompanying drawings, which schematically-depicts the verification system in accordance with the invention.

DETAILED DESCRIPTION OF AN ILLUSTRATIVE EMBODIMENT

With reference to the FIG., a verification system in accordance with the invention includes a card 10 and a card reader arrangement 11. The card 10 may be, for example, a laminated plastic card or the like, which may be generally similar in size and shape to a credit or bank card or other form of identification card. Card 10 includes an image 12 on a front surface and a magnetic strip 13 on a reverse surface. The image 12 may be any image, preferably including personal indicia of an authorized user or bearer, such as an image of the face or signature of the authorized user or bear, or of his or her fingerprint, for example.

The magnetic strip 13 is encoded with, inter alia, digital information, in encrypted form, representing the image 12 or some predetermined portion or portions thereof. In the encoding operation, as preferably performed by or under the auspices of the card issuer, the image is scanned by a digital scanner, each point of the image, termed a "picture element" or "pixel," is defined by a digital word representing a numerical value representing the luminosity or brightness of the pixel. The encryption is preferably performed by the card issuer using a private key, selected such that the encrypted information can be decrypted using a different key which the card issuer can make public. In such a private-key/public-key encryption arrangement, the public key cannot be used thereafter to correctly encrypt the information representing the image. Nor can other keys be used to correctly encrypt the information, which may assist in discouraging forgery or unauthorized alteration of the information on the magnetic strip 13.

The card reader arrangement 11 is used at the point at which the card bearer wishes to use the card 10 in a transaction. The card reader arrangement 11 includes a scanner 14, a magnetic strip reader 15 and a processor 16. The scanner 14 scans the image 12 and a digitizer 20 in the processor 16 generates a digital information stream that defines the image. As is conventional, the digitizer 20 generates a series of digital words for the pixels of the image, each representing a numerical value representing the brightness or luminosity of a point of the image 12. The sequence of words generated by the digitizer 20 is coupled to one input terminal of a comparison circuit 21.

The magnetic strip reader 15 reads the information encoded on magnetic strip 13 and transmits it to a decryption circuit 22. As noted above, the information encoded on the strip 13 is in encrypted form, and the decryption circuit 22 uses a public key to generate decrypted information. The decryption circuit 22 also generates the decrypted information in the form of a sequence of digital words, which it couples to a second input terminal of comparison circuit 21. The comparison circuit 21 compares the image words from the digitizer 20 and those from the decryption circuit 22 and enables an indicator 23 to indicate a degree of conformance or similarity therebetween.

As noted above, the card reader arrangement 11 is used at the point at which the card bearer wishes the use the card 10 in a transaction. At that point, a clerk, or the like, at the establishment at which the card is being used may compare the image 12 with the corresponding personal indicia of the bearer and determine whether they conform. For example, if the image 12 is that of the bearer, the clerk may visually compare the image with the appearance of the bearer, and if they conform, and if the indicator 23 indicates the required degree of conformance between the image 12 and the information on the magnetic strip 13, allow the transaction to continue. Alternatively, if the image 12 is an signature, the clerk may visually compare a fresh signature by the bearer, and if they conform and if the indicator 23 indicates the required degree of conformance, allow the transaction to continue. Similarly if the image is a fingerprint.

It will be appreciated that the degree of conformance required by the indicator may be less than a complete match, depending on the likely error rate of the scanner 14 and magnetic strip reader 15 in scanning the image and magnetic strip, respectfully. In addition, it will be appreciated that the processor 16 may use selected portions of image information from the scanner 14, rather than from the entire image 12, and the information encoded on the magnetic strip 13 may define the portions of the image information to be used. In addition, the image 12, as affixed to the card 10, may be processed enhanced to enhance particular pixels, to reduce the likelihood of errors during the scanning process.

It will be further appreciated that verification system provides an inexpensive arrangement for verifying that a bearer of a credit or bank card or the like is an authorized user. The system uses a card reader 11 which will be less expensive than those which may display images defined by information recorded on the card. In addition, manufacture of the cards will be similarly inexpensive.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A verification system for verifying that an identification card, such as a bank or credit card or the like is not a counterfeit and for further verifying that a user of the identification card is an authorized user, comprising:
   A. the identification card including:
      i. an image including predetermined indicia representative of a selected characteristic of the authorized user, and
      ii. a digital information store for storing information comprising a digital encoding representing said image;
   B. a card reader including
      i. an image reader for generating digital encoding representing said image in response to said image;
      ii. an information store reader for retrieving said digital information from said information store; and
      iii. a comparator for comparing the digital encoding generated by said image reader to the digital information retrieved by said information store reader and for generating in response to the comparison an indication identifying a degree of correspondence there between wherein the degree of correspondence as determined by the comparator verifies the counterfeit status of the identification card, and the user is verified as the authorized user by comparison of the predetermined indicia with the selected characteristic of the user.

2. A verification system as defined in claim 1 in which the information stored in said information store is in encrypted form, said information store reader including a decryption circuit for performing a decryption operation in connection with a decryption key to generate decrypted information, said comparator using said information.

3. For use in a verification system for verifying that an identification card, such as a bank or credit card or the like is not a counterfeit and for further verifying that a user of the identification card is an authorized user, a card including:
   A. an image including predetermined indicia representative of a selected characteristic of the authorized user, and
   B. a digital information store for storing information comprising a digital encoding representing said image wherein the degree of correspondence between digital encoding represent said image and said digital information in said digital information store relating to the image verifies the counterfeit status of the identification card, and the user is verified as the authorized user by comparison of the predetermined indicia with the selected characteristic of the user.

4. A card as defined in claim 1 in which the information stored in said information store is in encrypted form.

5. For use in connection with an identification card, such as a bank or credit card or the like, the identification card including an image including predetermined indicia representative of a selected characteristic of an authorized user, and an information store for storing information representing said image, a card reader including

- A. an image reader for generating digital encoding representing said image in response to said image;
- B. an information store reader for retrieving digital information from the digital information store; and
- C. a comparator for comparing the digital encoding generated by said image reader to the digital information retrieved by said information store reader and for generating in response to the comparison an indication identifying a degree of correspondence there between wherein the degree of correspondence as determined by the comparator verifies the counterfeit status the identification card, and the user is verified as the authorized user by comparison of the predetermined indicia with the selected characteristic of the authorized user.

6. A card reader as defined in claim 5, in which the information stored in said information store is in encrypted form, said information store reader including a decryption circuit for performing a decryption operation in connection with a decryption key to generate decrypted information, said comparator using said information.

* * * * *